2,749,340

SULTAME-N-PHOSPHORIC ACID DIESTERS

Hans Feichtinger, Duisburg-Beeck, and Hans Tummes, Duisburg-Meiderich, Germany, assignors to Ruhrchemie Aktiengesellschaft, Oberhausen-Holten, Germany No Drawing. Application June 21, 1954,
Serial No. 438,307

Claims priority, application Germany June 22, 1953

5 Claims. (Cl. 260—243)

This invention relates to and has as its object novel sultame-N-phosphoric acid diesters.

The new compounds in accordance with the invention have the general formula:

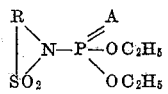

in which A is oxygen or sulfur and R is a straight or branched chain saturated divalent hydrocarbon radical having 4 carbon atoms.

The new compounds may be produced by reacting an alkali salt of a sultame having the general formula:

with a chlorophosphoric acid diethylester or chlorothiophosphoric acid diethylester having the general formula:

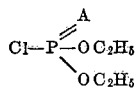

in which A and R are as described above and Me is an alkali metal.

The reaction proceeds in accordance with the following equation:

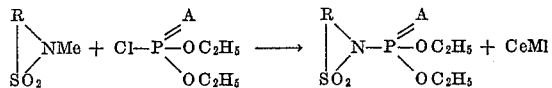

The starting alkali salts of the sultames may be obtained from the corresponding sultames by allowing an equivalent amount of alkali alcoholate to act upon a solution of the sultame in alcohol. The reaction solution is then evaporated under vacuum and the N-alkali sultames are obtained in solid form.

The sultames which are suitable for the process may be prepared from derivatives of substituted alkane sulfonic acids by a cyclization reaction, as, for example, from amino-alkane-sulfochloride hydrochlorides by means of alkali, from chloralkane sulfonamides by heating and from oxyalkane sulfonic acid by the action of ammonia. Examples of simple sultames include γ-propane sultame, δ-butane sultame and α-methyl-γ-propane sultame.

The production of suitable sultames and their alkali salts is, for example, described in further detail in our copending application Serial No. 428,114, filed May 6, 1954.

The reaction between the chlorophosphoric acid diester and the alkali sultame is effected by suspending the alkali sultame in an inert solvent, as, for example, benzene, ether or dioxane, and mixing in an equivalent amount of the chlorophosphoric acid diester while stirring. Any quantity of inert solvent may be used, it being essential, however, to thoroughly suspend the alkali sultame. In general, the quantity of solvent is 5 to 20 times that of the alkali sultame charged.

The reaction temperature may range between 20 and 100° C. The reaction is terminated when the basic alkali sultame is completely consumed. This may easily be ascertained when the suspended precipitate of the reaction mixture no longer has a basic reaction to the addition of water. In general, a reaction time of 2–3 hours is required.

The isolation of the sultame-phosphoric acid diester is effected by evaporating the reaction solution under vacuum. This generally results in a sufficiently pure reaction product. If desired, however, further purification may be effected by high vacuum distillation.

The sultame-phosphoric acid diesters produced in accordance with the invention are colorless oils which are partially miscible with water and well misible with most organic solvents. They constitute excellent pesticides.

The following examples are given by way of illustration and not limitation:

Example 1

67.4 grams α-methyl-γ-propane sultame were added to a solution of 37 grams sodium methylate in 1000 cc. absolute methanol. The solvent was evaporated under vacuum until the sodium sultame remained as a solid white residue. After the addition of 1000 cc. absolute benzene, the sodium sultame was suspended as finely as possible by vigorous stirring. The mixture was heated to 50° C. and 86 grams chlorophosphoric acid diethylester were allowed to slowly drop in. After stirring for 2 hours, the benzene was evaporated on a water bath and the residue was heated under high vacuum at 150° C. until a distillate no longer escaped overhead. The distillation residue had a weight of 130.5 grams and represented a colorless oil having a weak odor, a specific gravity of $d_4^{27}$ of 1.2689 and a refractive index $n_D^{20}$ of 1.4665.

The analysis showed the composition of an α-methyl-γ-propane sultame-N-diethoxyloxyphosphine having the formula:

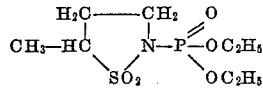

Formula: $C_8H_{18}O_5NSP$
Molecular weight: 271.28

|   | Calculated, percent | Found, percent |
|---|---|---|
| C | 35.42 | 36.04 |
| H | 6.69 | 6.59 |
| N | 5.16 | 4.74 |
| S | 11.82 | 11.20 |

The high insecticidic action of α-methyl-γ-propane sultame - N - diethyloxyloxyphosphine becomes obvious from the following tests on potato beetles:

Potato beetles were placed in glass vessels having a size of 10 x 5 x 5 centimeters, the number of beetles being 25 for each vessel. Fresh leaves of potato plants which had been sprayed with a solution of α-methyl-γ-propane sultame-N-diethyloxyloxyphosphine were then given into the vessels. The concentration of the insecticide in the solution was 1%, 0.5%, and 0.1%, respectively.

The following table shows the percentage of potato beetles killed after a duration of action of 4 and 24 hours, respectively:

| Concentration of insecticide in the aqueous suspension | Percent of potato beetles killed | |
|---|---|---|
| | after 4 hours | after 24 hours |
| 0% | 0 | 0 |
| 1.0% | 100 | 100 |
| 0.5% | 90 | 100 |
| 0.1% | 40 | 60 |

*Example 2*

17.2 gms. chlorophosphoric acid diethylester were slowly added at 35° C. to a thoroughly stirred suspension of 15.7 gms. N-sodium-δ-butane sultame in 200 cc. benzene. After 1 hour, the reaction solution was evaporated under vacuum on a water bath and the remaining colorless oil was heated under high vacuum at 150° C. until a distillate no longer escaped overhead. The residue consisted of 25 gms. of a colorless oil which largely represented pure δ-butane sultame-N-diethoxyloxyphosphine having the following formula:

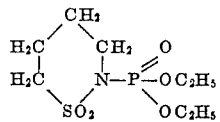

*Example 3*

28.2 grams chlorothiophosphoric acid diethylester, at 50° C., were slowly added dropwise within 1 hour to a thoroughly stirred suspension of 21 grams N-sodium-α-methyl-γ-propane sultame in 300 cc. benzene and the reaction solution was then heated for 6 hours with reflux. Thereafter, the reaction solution was cooled and shaken with 50 cc. of water. Following this, the two layers were separated in a separating funnel and the benzene solution separated was dried with sodium sulfate. This solution was then distilled. After evaporation of the benzene, the remaining residue, under a pressure of 1 mm. Hg, was heated to 140° C. until a distillate no longer escaped overhead. The distillation residue represented a yellowish colored oil having an unpleasant odor and substantially consisting of α-methyl-γ-propane sultame-N-diethyloxylthiophosphine.

We claim:

1. As a new chemical compound a sultame-N-phosphoric acid diethylester having the general formula:

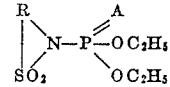

in which A is a member selected from the group consisting of oxygen and sulfur and R is a divalent saturated hydrocarbon radical having 4 carbon atoms, at least 3 carbon atoms of which are in the sultame ring.

2. Process for the production of sultame-N-phosphoric acid diethylesters which comprises suspending an alkali sultame salt having the general formula:

in which R is a divalent saturated hydrocarbon radical having 4 carbon atoms at least 3 carbon atoms of which are in the sultame ring, and Me is an alkali metal, in an inert solvent, thereafter contacting the suspended alkali sultame salt with a chlorophosphoric acid diethylester having the formula:

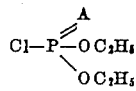

in which A is a member selected from the group consisting of oxygen and sulfur at a temperature between 20 and 100° C. and recovering the sultame N-phosphoric acid diester formed.

3. Process in accordance with claim 2, in which said inert solvent is a member selected from the group consisting of benzene, ether, and dioxane.

4. Process in accordance with claim 2, in which said alkali sultame salt and said chloro-phosphoric acid diethylester are present in equivalent amounts.

5. Process in accordance with claim 2, in which said solvent is present in an amount of from 5 to 20 times the alkali sultame salt present.

No reference cited.